(12) United States Patent
Nechitailo (10) Patent No.: US 6,922,512 B2
(45) Date of Patent: Jul. 26, 2005

(54) NON-ROUND FILLER RODS AND TUBES WITH SUPERABSORBENT WATER SWELLABLE MATERIAL FOR LARGE CABLES

(75) Inventor: Nicholas V. Nechitailo, Conover, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/272,007

(22) Filed: Oct. 17, 2002

(65) Prior Publication Data

US 2004/0076386 A1 Apr. 22, 2004

(51) Int. Cl.[7] .............................................. G02B 6/44
(52) U.S. Cl. ...................................................... 385/113
(58) Field of Search ......................... 385/109–113, 100, 385/105, 106

(56) References Cited

U.S. PATENT DOCUMENTS

| | | | |
|---|---|---|---|
| 4,312,566 A | * | 1/1982 | Jackson ...................... 385/113 |
| 4,355,865 A | | 10/1982 | Conrad et al. |
| 5,179,611 A | | 1/1993 | Umeda et al. |
| 5,373,100 A | | 12/1994 | Arroyo et al. |
| 5,389,442 A | | 2/1995 | Arroyo et al. |
| 5,630,003 A | | 5/1997 | Arroyo |
| 5,902,958 A | * | 5/1999 | Haxton ........................ 174/47 |
| 5,925,461 A | | 7/1999 | Fairgrieve |
| 5,999,676 A | * | 12/1999 | Hwang ........................ 385/106 |
| 6,141,473 A | * | 10/2000 | Song ............................ 385/114 |
| 6,151,434 A | * | 11/2000 | Bonicel ....................... 385/102 |
| 6,160,940 A | * | 12/2000 | Summers et al. ........... 385/110 |
| 6,167,180 A | | 12/2000 | Keller ........................ 385/113 |
| 6,169,834 B1 | * | 1/2001 | Keller ........................ 385/101 |
| 6,188,822 B1 | * | 2/2001 | McAlpine et al. ........... 385/100 |
| 6,198,865 B1 | | 3/2001 | Risch ......................... 385/113 |
| 6,249,629 B1 | | 6/2001 | Bringuier ..................... 385/113 |
| 6,304,701 B1 | | 10/2001 | Bringuier et al. |

FOREIGN PATENT DOCUMENTS

EP  0 945 479 A2  9/1999

* cited by examiner

Primary Examiner—Javaid H. Nasri
(74) Attorney, Agent, or Firm—Sughrue Mion, PLLC (57) ABSTRACT

A fiber optic cable having a plurality of buffer tubes and filler rods or filler tubes disposed between the inner surface of the outer jacket of the fiber optic cable and the buffer tubes. The buffer tubes contain a plurality of optical fibers. The filler rods have a non-round core surrounded by a superabsorbant water swellable coating to provide protection for the optical fibers against the penetration of water within the cable. The filler rods and filler tubes are made of a solid or porous or foam-type material expanding in the presence of water.

9 Claims, 7 Drawing Sheets

NON-ROUND FILLER RODS AND TUBES WITH SUPERABSORBENT WATER SWELLABLE MATERIAL FOR LARGE CABLES

BACKGROUND OF THE INVENTION

The present invention relates generally to filler rods for fiber optic cables, and more specifically to non-round filler rods containing an increased amount of superabsorbent water swellable material for large-diameter fiber optic cables.

Fiber optic cables have been used by the telecommunications industry for a number of years to transmit information at very high rates over long distances. Fiber optic cables come in a variety of configurations, including: cables with a centrally positioned single buffer tube containing one or more optical fibers; cables with a plurality of buffer tubes stranded in a helical or alternating helical arrangement about a central strength member; and cables with slotted cores in which a plurality of optical fibers reside.

Figure 1:
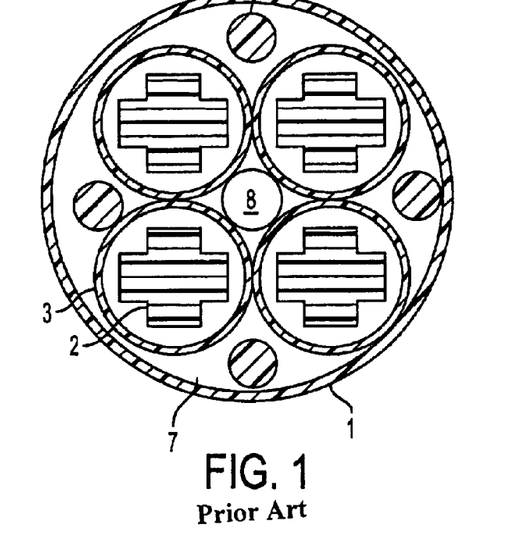
FIG. 1 is a cross-sectional view of a fiber optic cable having four buffer tubes and a central strength member.
Figure 2:
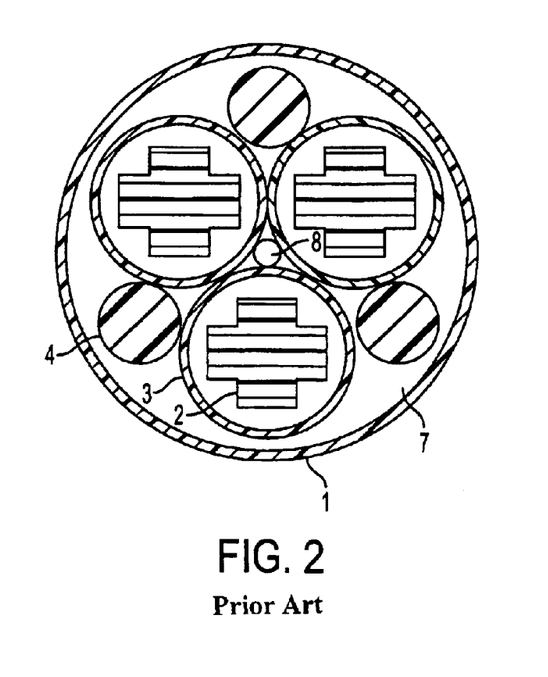
FIG. 2 is a cross-sectional view of a fiber optic cable having three buffer tubes and a central strength member.
Figure 3A:
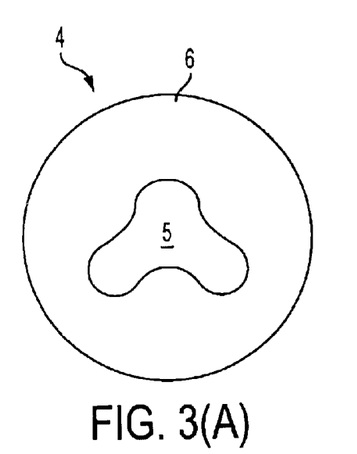
FIG. 3(a) is a cross-sectional view of a filler rod of the present invention having a non-round core.
Figure 3B:
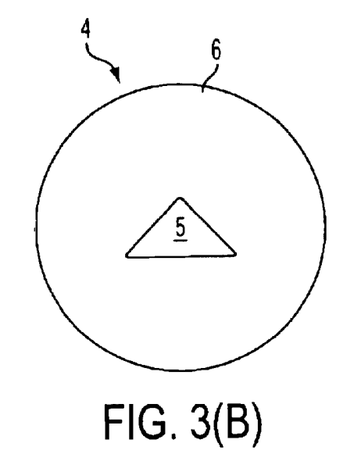
FIG. 3(b) is a cross-sectional view of a filler rod of the present invention having a triangular-shaped core.
Figure 3C:
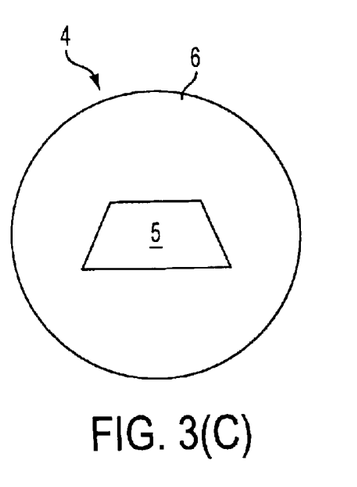
FIG. 3(c) is a cross-sectional view of a filler rod of the present invention having a trapezoidal-shaped core.
Figure 3D:
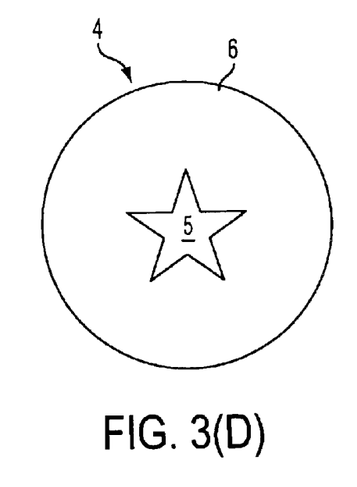
FIG. 3(d) is a cross-sectional view of a filler rod of the present invention having a star-shaped core.

The cables in metropolitan areas are expected to accommodate large numbers of fibers per cable. In particular, the fiber optic ribbon cables containing 864 and 1728 fibers are installed in 1.5 inch diameter ducts. As shown in FIGS. 1 and 2, one way to form such a cable is to use ribbons 2 in relatively large buffer tubes 3. Using a lower number of larger buffer tubes 3 is an efficient way to reduce the overall manufacturing cost of the cable. However, using a lower number of larger buffer tubes 3 produces relatively large gaps between the buffer tubes 3 and the interior surface of the cable outer jacket 1. Also, larger gaps are formed between the buffer tubes 3 and central strength member 8. These large gaps create a problem by allowing for water penetration along the length of the cable.

To overcome this problem by plugging the gaps, which act as water channels, filler rods 4 have been placed between the outer surface of the buffer tubes 3 and the interior surface of the cable outer jacket 1. These filler rods 4 have water swellable material surrounding an inner core. The inner core 5 of the filler rods 4 are generally made of plastic and have a round cross-sectional shape. While use of such filler rods 4 help close the interstitial gaps and to prevent water penetration along the cable, the amount of water swellable material now used is insufficient to plug the gaps or to properly protect the optical fibers, especially in the case of larger diameter cables with larger interstitial gaps. Additionally, the use of cores having round cross-sectional shapes minimizes the surface area to which the water swellable material is adhered. Therefore, it is desired to have filler rods and filler tubes which maximize the amount of water swellable material capable of being adhered thereto.

SUMMARY OF THE INVENTION

To provide greater protection from water penetration, novel filler tubes and rods are disclosed. Throughout the remainder of the specification, the term filler rod will be used for the tube of convenience. However the term filler rod as so used is meant to encompass one or more filler rods, filler tubes, or equivalent structure. The filler rod maximizes the amount of water swellable material while also maximizing the surface area of the core of the filler rod which serves as a substrate for the water swellable material. Additionally, the cross-sectional shape of the filler rod can be designed to match the cross-sectional shape of the interstitial gaps found in the cable between the buffer tubes 3 and the cable outer jacket 1.

The filler rod can be designed in one of many ways. The first design is a filler rod having a core and a water swellable coating surrounding the core. In order to increase the amount of surface area which serves as a substrate for the surrounding water swellable coating, the core of the filler rod is in a non-round cross-sectional shape. In this way, the water swellable coating adheres to an increased amount of surface area of the core. Furthermore, the water swellable coating can then be shaped to match the cross-sectional shape of the interstitial gaps found in the cable between the buffer tubes 3 and the cable outer jacket 1.

Another design is a filler rod which does not have a core but instead is made entirely out of a suberabsorbant water swellable material. In this manner, no core is required and the amount of water swellable material is maximized. Increasing the amount of water swellable material also increases the effectiveness and speed of gap plugging. Additionally, this type of filler rod can also be shaped to match the cross-sectional shape of the interstitial gaps found in the cable between the buffer tubes 3 and the cable outer jacket 1. With the interstitial gaps filled, the cable is afforded its greatest protection against water penetration.

BRIEF DESCRIPTION OF THE DRAWINGS

The above aspects of the present invention will become more apparent by describing in detail embodiments thereof with reference to the attached drawings, in which.

DETAILED DESCRIPTION OF A PREFERRED EMBODIMENT

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to one skilled in the art.

Referring to FIGS. 1–5, a fiber optic cable having at least one novel filler rod or tube will now be described. The fiber optic cable is comprised of a plurality of buffer tubes 3, each of which contains a plurality of optical fibers. In larger cables, the number of optical fibers can reach around 864 to 1728. The buffer tubes 3 are generally round in cross-section. The buffer tubes 3 are disposed adjacent to one another within the cable outer jacket 1, although the buffer tubes 3 do not have to contact each other. However, in order to maximize the number of buffer tubes 3 within a cable, it is preferable for the buffer tubes 3 to contact each other.

Additionally, the number, size and shape of the buffer tubes 3 disposed within the fiber optic cable can vary. There may also be concentric layers of buffer tubes in the cable. However, regardless of the number, size and shape of the buffer tubes, interstitial gaps 7 are formed between outer surfaces of the buffer tubes and the cable outer jacket 1, or between outer surfaces of the buffer tubes and other neighboring structures. Examples of these interstitial gaps 7 are clearly illustrated in FIGS. 1, 2, 5 and 6. The larger the gaps 7, the more susceptible the cable is to damage from excessive water penetration.

The fiber optic cable of the present invention can also have one or more strength members. In a preferred embodiment, a central strength member 8 is disposed in the center of the fiber optic cable, in the central interstitial gap 7 formed by the buffer tubes 3. The central strength rods 8 are typically made of glass reinforced composites (in the usual configuration). However, other types of strength rod may be used. Another configuration is glass reinforced rods or steel wires embedded radially in the plastic outer jacket 1. The strength members or rods provide strength for pulling the cable, as well as resistance to contraction of the plastic materials at low temperature and expansion at high temperature. They are usually mechanically strong and thermally less expanding (with lower coefficient of thermal expansion as compared to the plastic materials). Also, they serve as strength elements to push the cable in the ducts during installation and to reduce cable buckling.

As stated above, large interstitial gaps 7 are formed between the buffer tubes 3 and neighboring structures such as, for example, the cable outer jacket 1. Filler rods 4 with a superabsorbent water swellable coating 6 are disposed in these interstitial gaps 7 in order to prevent water propagation along the cable length and, subsequently, damage to the optical fibers. In an embodiment of the present invention illustrated in FIG. 3, the filler rods 4 have a non-round core 5 surrounded by a superabsorbent water swellable coating 6. In a preferred embodiment of the present invention illustrated in FIG. 4, the filler rods 4 do not have an inner core but are instead made entirely out of a superabsorbent water swellable material 6 and take the cross-sectional shape of the interstitial gaps 7. Each of these embodiments will be discussed below.

FIG. 3 illustrates an embodiment of the present invention in which a filler rod 4 has a non-round core 5 surrounded by a superabsorbent water swellable coating 6. To provide the maximum protection against water penetration, maximization of the amount of superabsorbent water swellable material is desired. Additionally, to help keep the superabsorbent water swellable coating 6 adhered to the core, it is desirable to maximize the surface area of the core so that more coating 6 is in contact with the core. This is done by having a non-round core 5 that has a non-round cross-sectional shape. Essentially, a round or circular cross-sectional shape minimizes the surface area of the core, while a non-round core 5 having a cross-sectional shape increases the surface area of the core.

The core of the filler rod 4 of the present invention can have many different cross-sectional shapes. For example, the non-round core 5 can have a cross-sectional shape of a triangle, trapezoid or star. The non-round core can also be hollow, as a tube with water swellable material attached to both outer and inner surfaces. Furthermore, the non-round core 5 can be made of a variety of materials such as yarn, thermoplastic material or other polymeric material. Fiber-Line® is a producer of various yarns that can be used to deposit water swellable powder. Plastic or polymeric materials to be used for this purpose include polypropylene, polyethylene and other materials. The core can be solid as regular polyethylene or porous to further increase the surface area. The largest surface area would be in cores having an open cell foam structure.

The non-round core 5 is surrounded by a water swellable coating 6 which can also be superabsorbent. Suitable materials for the coating 6 are commercially available and include water swellable materials from Scapa Polymerics and Fiber-Line®. The coating is a blend of fine Super Absorbent Polymer (SAP) in a resin matrix. Swellcoat yarn, by Fiber-Line®, is an example of such a coating. Swellcoat yarns are available in polyester and aramid fibers and are an efficient method to introducing SAP into the cables.

The coating 6, in its final state, can also be a variety of shapes. As shown in FIG. 3, the final cross-sectional area of the filler rod 4 can be round (although the core 5 is non-round). However, the filler rod 4, in its final state, can also be shaped to match the cross-sectional shape of the interstitial gaps 7 in the cable that are formed between the buffer tubes 3 and the interior surface of the cable outer jacket 1. By shaping the filler rod 4 to match the cross-sectional shape of the interstitial gaps 7 in the cable, the gaps 7 are significantly reduced, thereby blocking space between the buffer tubes 3.

In a preferred embodiment, the filler rod 4 does not have a core but instead is made entirely out of a superabsorbent water swellable material 6. Such filler rods 4 should preferably have a sufficient tensile strength to be used on stranding machines. Longitudinal tensile strength of the filler rods 4 should be close to that for the yarns with the water swellable materials, which is typically in the range from 20 to 40 N/cm. One example of such a material is hotmelt. Henkel Group, a Germany-based company produces a variety of hotmelt polymers reacting with water that can be used for water blocking purposes. These and other similar polymeric rod materials have required tensile strength to be used on stranding machines to be placed in the interstitial gaps.

Figure 4A:
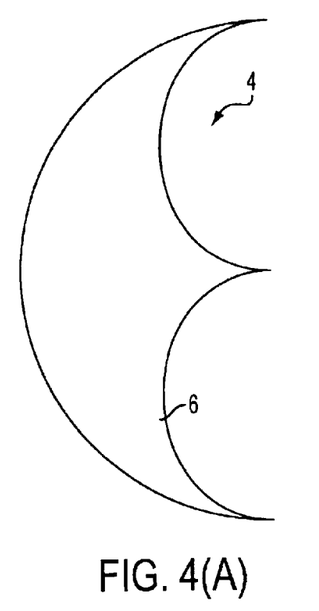
FIG. 4(a) is a cross-sectional view of a filler rod of the present invention having a non-round cross-sectional shape.
Figure 4B:
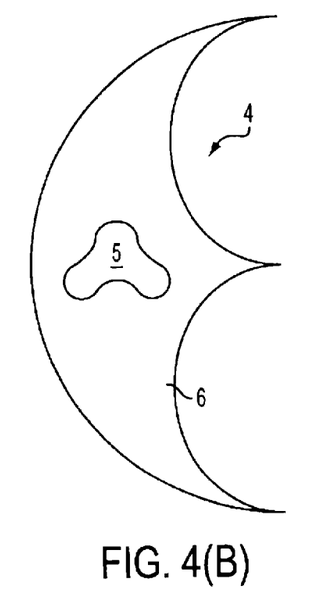
FIG. 4(b) is a cross-sectional view of a filler rod of the present invention having a non-round cross-sectional shape and a non-round core.
Figure 5:
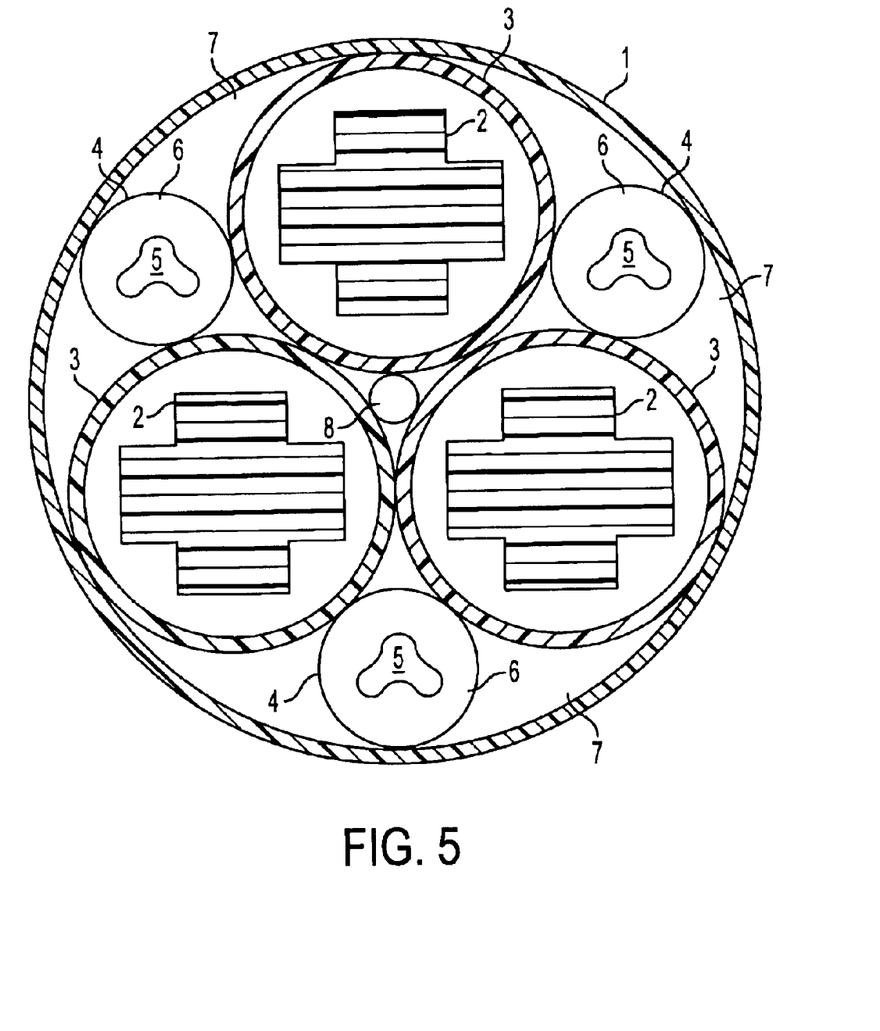
FIG. 5 is a cross-sectional view of a fiber optic cable of the present invention having three filler rods each with a non-round core.
Figure 6:
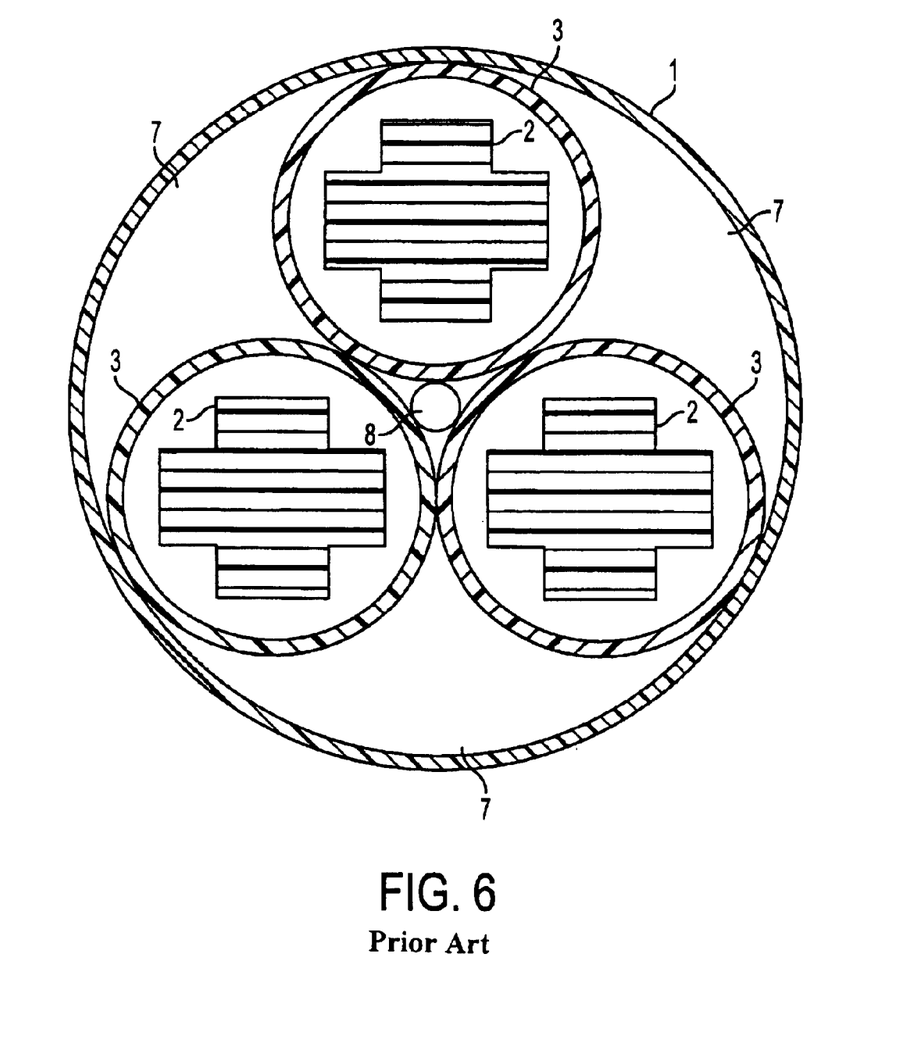
FIG. 6 is a cross-sectional view of a fiber optic cable without filler rods disposed therein.
Figure 7:
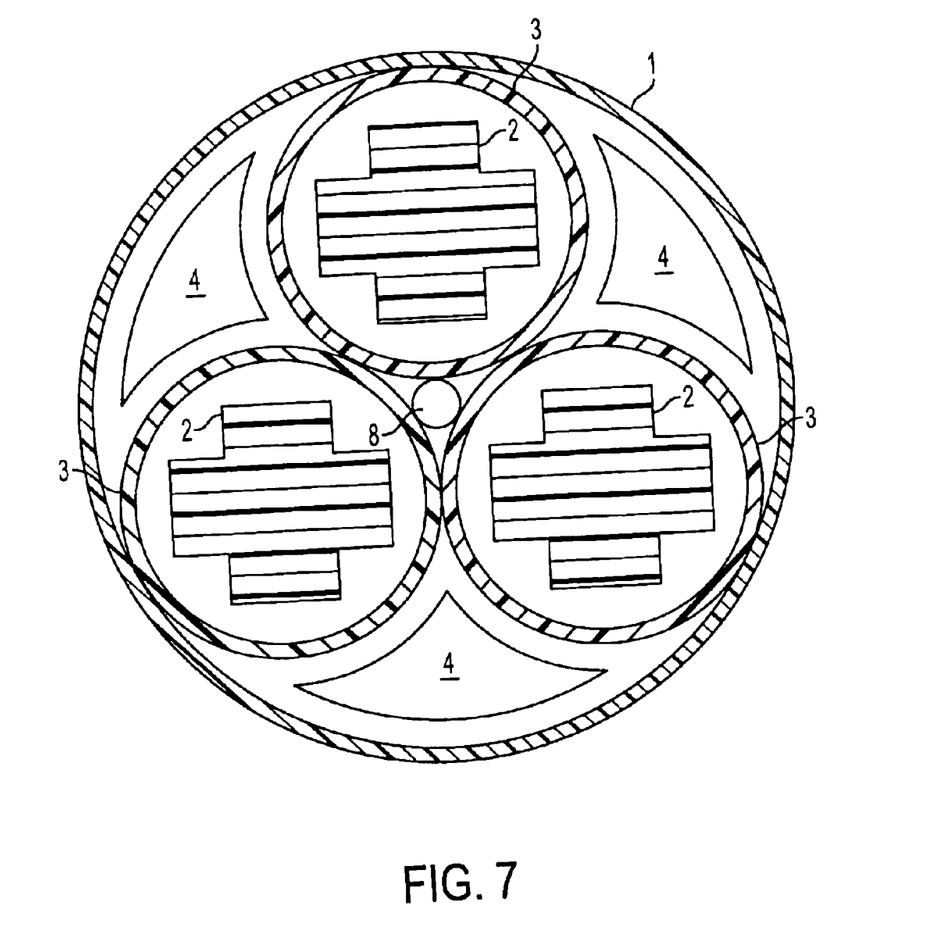
FIG. 7 is a cross-sectional view of a fiber optic cable having filler rods that correspond to the cross-sectional shape of the interstitial gaps of the cable.

Furthermore, as shown in FIG. 4, the non-core filler rods can be shaped to match the cross-sectional shape of the interstitial gaps 7 in the cable that are formed between the buffer tubes 3 and the interior surface of the cable outer jacket 1. Thus, the interstitial gaps 7 of the cable are efficiently plugged to prevent water penetration along the length of the cable.

Figure 8:
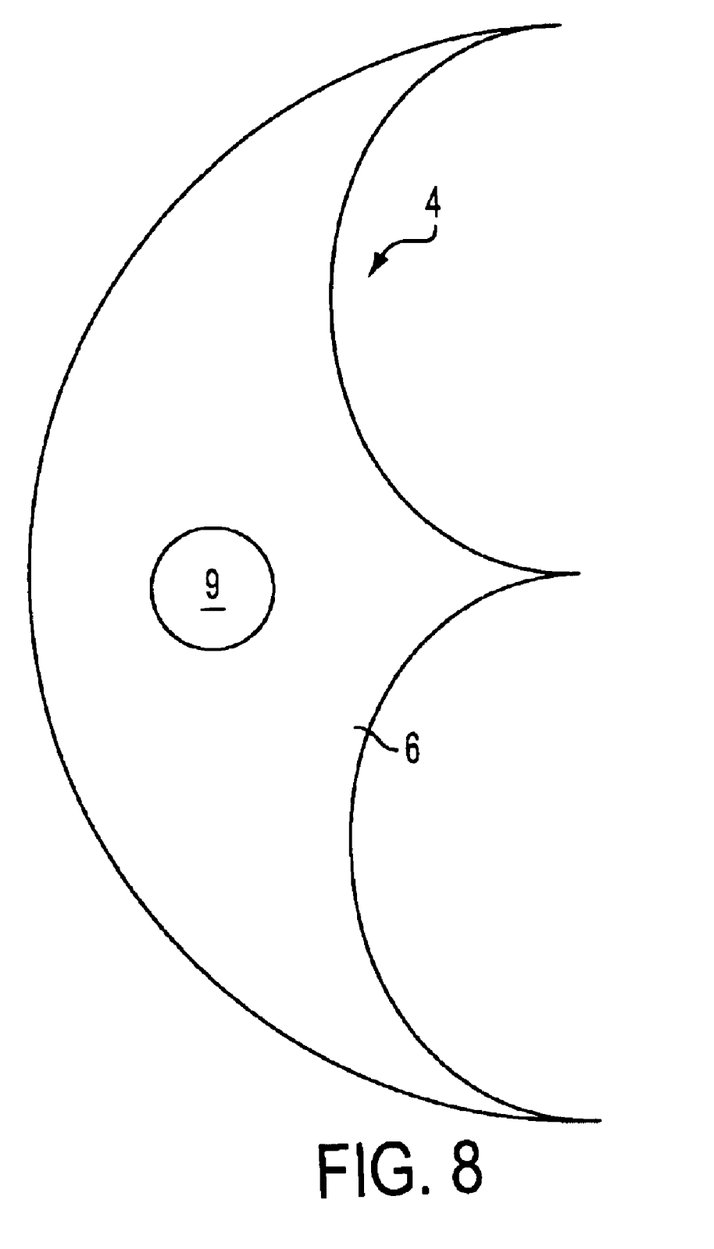
FIG. 8 is a cross-sectional view of a hollow filler rod or a filler tube of the present invention.

As shown in FIG. 8, the filler rods 4 of the present invention can also be hollow filler rods or filler tubes that are shaped to match the cross-sectional shape of the interstitial gaps 7 in the cable. By having a hollow filler rod 4 with a hollow core 9, the cable weighs less while still blocking any moisture or water that has penetrated the cable. The non-round final shape of the filler rod 4 can be achieved by using thin-walled tubes with regular circular cross-section. These tubes, especially when heated, will be deformed into a shape closer to a triangle with rounded corners thereby complying with the shape of the interstitial gaps 7. Typically, the compliant-shape deformation of the filler tubes 4 occurs when binder yarns are applied over the core (i.e. assembly of the buffer tubes and filler tubes) and then after an outer jacket 1 is extruded (and subsequently shrunk) over the cable core.

The fiber optic cables are produced in the following manner. First, buffer tubes 3 with fibers 2 are made. Then the buffer tubes 3 with fiber 2 are stranded around the strength rod 8. During stranding, the buffer tubes 3 go through a die that is a plate with several radially disposed holes. This plate also has additional holes for the filler rods. The filler rods 4 are pre-manufactured either (1) on a substrate, such as a yarn, and having a non-round core, or (2) as a polymeric rod—solid or porous, without a core, capable of swelling in the presence of water. The plate rotates back and fourth and a core comprised of the buffer tubes 3 and filler rods 4 is formed around the central strength member 8. A thin binder is usually applied over the core to keep the core as one unit. Then, a plastic cable outer jacket 1 is extruded over the core.

It is understood that departures can be made from the preferred embodiments of the invention by those of ordinary skill in the art without departing from the spirit and scope of the invention that is limited only by the following claims

What is claimed is:

1. A fiber optic cable comprising:
   an outer jacket having an inner surface;
   a plurality of buffer tubes containing a plurality of optical fibers, adjacent buffer tubes and the inner surface of the outer jacket defining an interstitial gap therebetween having a predetermined cross-sectional shape; and
   at least one filler rod disposed in said interstitial gap and having a cross-sectional shape which substantially corresponds to the predetermined cross-sectional shape of the interstitial gap;
   wherein said at least one filler rod comprises:
   a core; and
   a water swellable coating surrounding said core.

2. The fiber optic cable of claim 1, wherein said core is made of solid or porous polymeric material.

3. The fiber optic cable of claim 1, wherein said core is made of a thermoplastic material.

4. The fiber optic cable of claim 1, wherein said core is made of yarn.

5. The fiber optic cable of claim 1, wherein said at least one filler rod is non-round in cross-sectional shape.

6. The optical fiber cable of claim 1, wherein said core is substantially triangular in cross-sectional shape.

7. The fiber optic cable of claim 1, wherein said core is substantially trapezoidal in cross-sectional shape.

8. A fiber optic cable comprising:
   an outer jacket having an inner surface;
   a plurality of buffer tubes containing a plurality of optical fibers, adjacent buffer tubes and the inner surface of the outer jacket defining an interstitial gap therebetween having a predetermined cross-sectional shape; and
   at least one filler rod disposed in said interstitial, wherein said at least one filler rod is formed of a water swellable material having a cross-sectional shape substantially corresponding to the cross-sectional shape of the interstitial gap.

9. The fiber optic cable of claim 8, wherein said at least one filler rod is hollow or tubular.

* * * * *